(12) United States Patent
Spoto et al.

(10) Patent No.: US 9,917,324 B2
(45) Date of Patent: Mar. 13, 2018

(54) SYSTEM FOR GENERATING ELECTRIC POWER WITH MICRO FUEL CELLS AND CORRESPONDING PROCESS

(75) Inventors: Giuseppe Emanuele Spoto, Trecastagni (IT); Andrea Lazzara, Pedara (IT); Cristian Dall'Oglio, Niscemi (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 946 days.

(21) Appl. No.: 13/097,649

(22) Filed: Apr. 29, 2011

(65) Prior Publication Data

US 2011/0269044 A1 Nov. 3, 2011

(30) Foreign Application Priority Data

Apr. 30, 2010 (IT) .............................. MI2010A0760

(51) Int. Cl.
*H01M 8/04* (2016.01)
*H01M 8/22* (2006.01)
*H01M 8/24* (2016.01)
*H01M 8/242* (2016.01)
*H01M 8/0256* (2016.01)
*H01M 8/0202* (2016.01)
*H01M 8/1018* (2016.01)

(52) U.S. Cl.
CPC ......... *H01M 8/242* (2013.01); *H01M 8/0256* (2013.01); *H01M 8/0269* (2013.01); *H01M 2008/1095* (2013.01)

(58) Field of Classification Search
USPC .................................. 429/447, 456, 462, 471
See application file for complete search history.

(56) References Cited

U.S. PATENT DOCUMENTS

| | | | |
|---|---|---|---|
| 5,952,118 A * | 9/1999 | Ledjeff | H01M 8/0204 429/434 |
| 7,582,329 B2 | 9/2009 | Schmitz et al. | |
| 7,655,331 B2 * | 2/2010 | Adams et al. | 429/410 |
| 2003/0077498 A1 * | 4/2003 | Cable et al. | 429/32 |
| 2003/0096147 A1 * | 5/2003 | Badding et al. | 429/30 |
| 2005/0170235 A1 * | 8/2005 | Hu et al. | 429/38 |
| 2006/0040169 A1 | 2/2006 | Liu et al. | |
| 2006/0216574 A1 | 9/2006 | Yoshida et al. | |
| 2008/0070082 A1 | 3/2008 | Norimatsu et al. | |
| 2008/0107926 A1 | 5/2008 | Yamada et al. | |

(Continued)

OTHER PUBLICATIONS

Search report for Italian Application No. MI20100760, Ministero dello Sviluppo Economico, Munich, dated Dec. 16, 2010, pp. 2.

(Continued)

*Primary Examiner* — Barbara L Gilliam
*Assistant Examiner* — Adam A Arciero
(74) *Attorney, Agent, or Firm* — Slater Matsil, LLP

(57) ABSTRACT

Embodiment of a system for generating electric power with micro fuel cells comprising at least one first micro cell and at least one second micro cell, each micro cell having an anode and a cathode with a membrane being sandwich-wise interposed, the system comprising a spacer element having an annular element that surrounds a cavity, said spacer element being associated with said anode of said first micro cell and with said anode of said second micro cell to realize a common diffusion chamber for the fuel of said first micro cell a of said second micro cell.

22 Claims, 6 Drawing Sheets

(56) References Cited

U.S. PATENT DOCUMENTS

2008/0123814 A1* 5/2008 Curtis ................ A61B 6/4405
378/102

OTHER PUBLICATIONS

Zhiyong Xiao, Chunhua Feng, Philip C.H. Chan, and I-Ming Hsing, "Monolithically Integrated Planar Micro Fuel Cell Arrays", Transducers & Eurosensors '07, The 14th International Conference on Solid State Sensors, Actuators and Microsystems, Lyon, France, Jun. 10-14, 2007, pp. 923-926.

Ryan O'Hayre, Daniel Braithwaite, Weston Hermann, Sang-Joon Lee, Tibor Fabian, Suk-Won Cha, Yuji Saito, Fritz B. Prinz, "Development of portable fuel cell arrays with printed-circuit technology", Journal of Power Sources 124 (2003) 459-472.

Michael W. Ellis, Michael R. Von Spakovsky, and Douglas J. Nelson, "Fuel Cell Systems: Efficient, Flexible Energy Conversion for the 21st Century", Proceedings of the IEEE, vol. 89, No. 12, Dec. 2001, pp. 1808-1818.

J.H. Hirschenhofer, D.B. Stauffer, R.R. Engleman, and M.G. Klett, "Fuel Cell Handbook" Fourth Edition, Nov. 1998, pp. 1-268.

\* cited by examiner

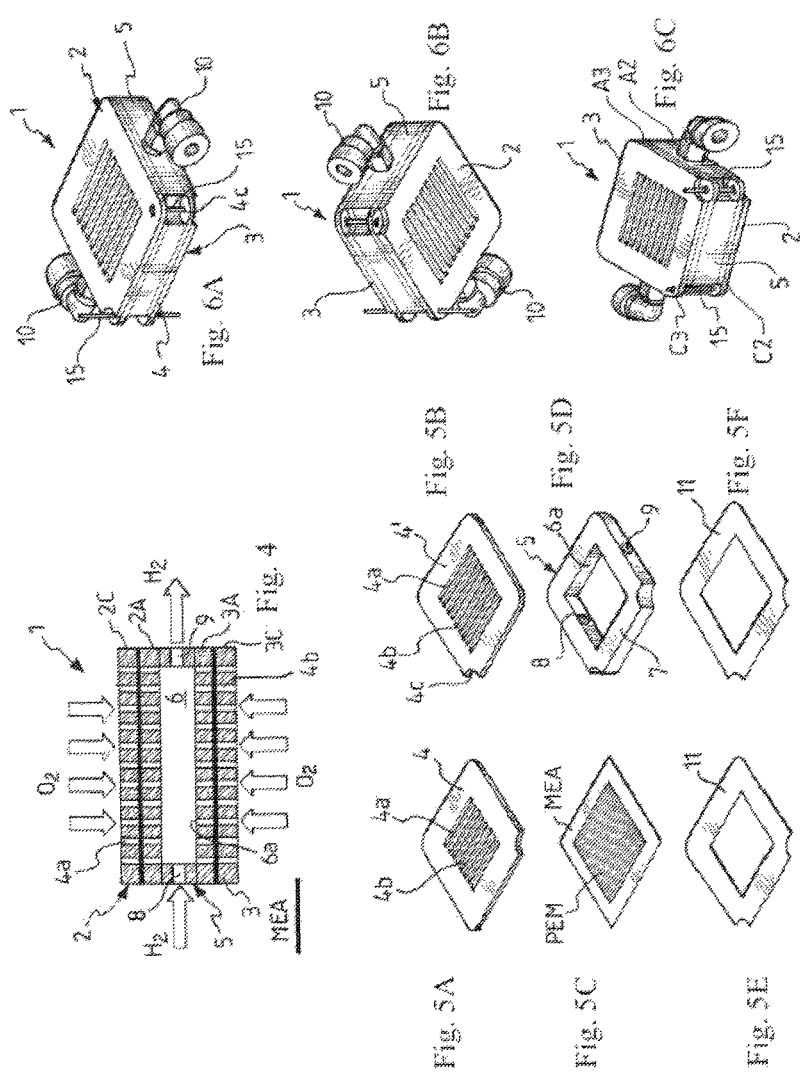

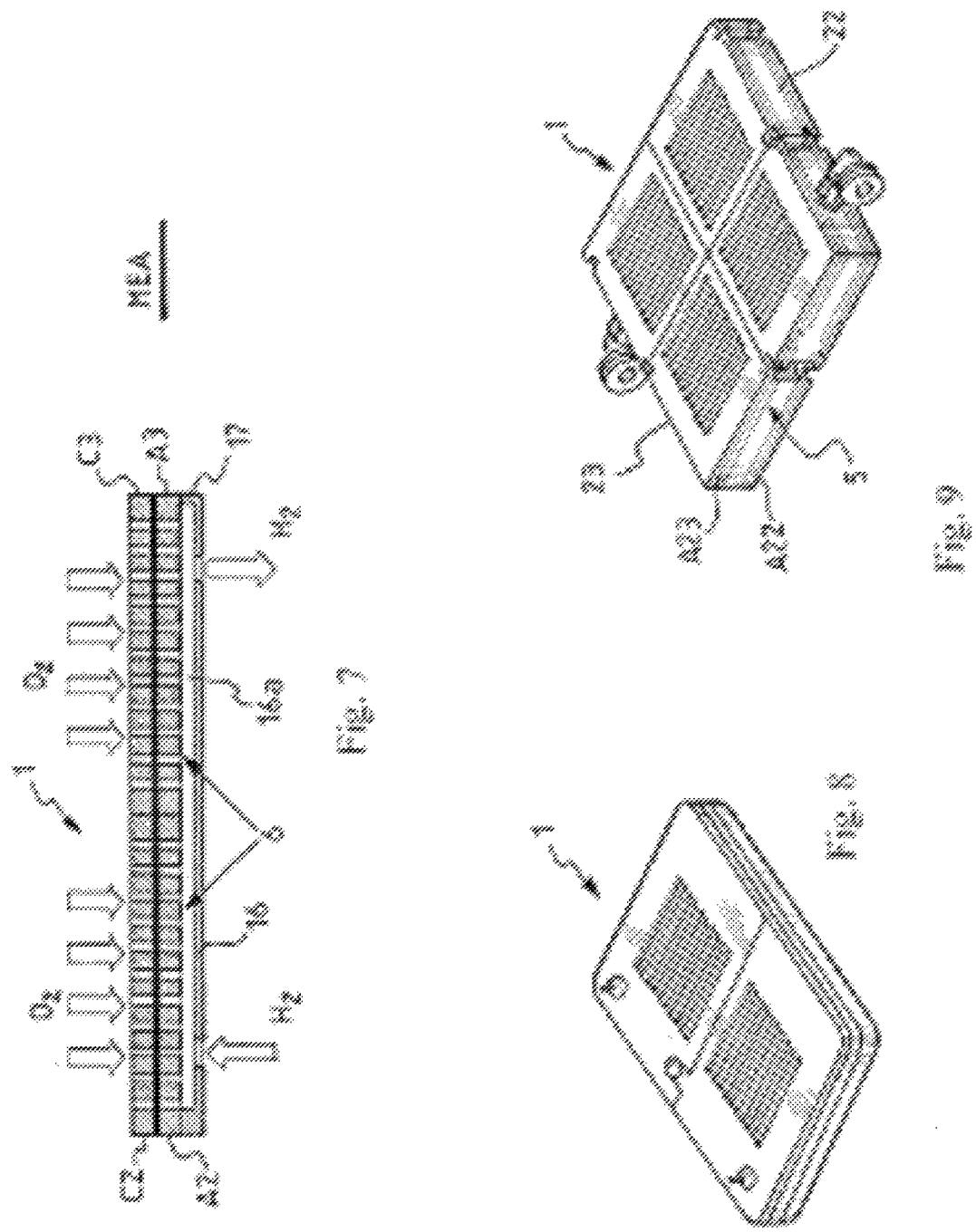

SYSTEM FOR GENERATING ELECTRIC POWER WITH MICRO FUEL CELLS AND CORRESPONDING PROCESS

PRIORITY CLAIM

The instant application claims priority to Italian Patent Application No. MI2010A000760, filed Apr. 30, 2010, which application is incorporated herein by reference in its entirety.

TECHNICAL FIELD

An embodiment relates to the field of production of electric power with the use of micro fuel cells (FC) particularly but not exclusively intended for being used in portable electronic applications, such as cell phones, PDA, Laptops and similar devices.

In particular, an embodiment relates to a system for generating electric power with micro fuel cells comprising at least one first micro fuel cell and at least one second micro fuel cell, each micro cell having an anode and a cathode with a membrane MEA being sandwich-wise interposed.

An embodiment also relates to a process for generating electric power with a system comprising at least two micro fuel cells.

BACKGROUND

It is known that the growing demand for portable electronic applications has caused an intense and strong interest of the experts in the field towards the development of alternative sources of high-density electric power such as Micro Fuel Cells, suitable for substituting traditional batteries with lithium ions.

Micro Fuel Cells that will be hereafter called micro cells, are devices that allow an easy, clean obtainment of electric power, with high performances. Micro cells exploit the energetic content of a particular chemical fuel, such as for example hydrogen or methanol, and through oxide-reduction reactions they produce electric power, in continuous current, supplying as reaction by-products: heat and water. Micro cells are thus very desirable also from their viewpoint of the low environmental impact.

A micro cell supplied with hydrogen is shown in FIG. 1A and comprises:
an anode A supplied with gaseous hydrogen $H_2$ as a reactant and here, by means of a catalyst, it is separated into protons and electrons;
a cathode C supplied with oxygen as a reactant;
an electrolyte that separates the anode A and the cathode C which, in the present embodiment, instead of being liquid is solid and is made of a polymeric membrane PEM ("Proton Exchange Membrane") being sandwich-wise arranged between two carbon layers serving as electrodes so as to form a thin membrane MEA (Membrane Electrode Assembly).

The membrane PEM has the characteristic of easily absorbing the water, of not allowing the passage of the gases, thus maintaining hydrogen and oxygen separated from each other, and of being a conductor of ions but not of electrons. The electrons thus pass through an external circuit to the micro cell ensuring a continuous electric current suitable for supplying a load.

The carbon layers have a portion of a front layer that serves as a diffusion layer of the gas or GDL (Gas Diffusion Layer) and that comprises prearranged and suitable serpentines of outflow channels of the gaseous hydrogen $H_2$, as shown in FIG. 1B.

The electric power in continuous current produced by the micro cell is a function of the active area of the MEA and of the amount of reactants introduced into the anode A and the cathode C. The oxide-reduction reactions for the generation of the electric power to the anode A and to the cathode C, with a suitable catalyst being present, typically platinum Pt, are the following:

To the anode A: $H2 \rightarrow 2H^+ + 2e^-$
To the cathode C: $\frac{1}{2} O2 + 2H^+ + 2e^- \rightarrow H2O$
Globally: $H2 + \frac{1}{2} O2 \rightarrow H2O$ In some typologies of micro cells, called the "passive type" (passive mode) or "air-breathing", the oxygen supplied to the cathode C is provided in a natural way by the environment air surrounding the micro cell itself, while the gaseous hydrogen $H_2$ may be stored as compressed gas in high pressure cylinders, or as liquid hydrogen in suitable cryogenic containers, or in the solid state in metallic hydrides or in the liquid state in chemical hydrides or in other materials able to absorb it in considerable amount, such as carbon grounds.

To enhance the voltage to be supplied to the load, systems are provided with two or more micro cells coupled in series to define a so called "stack" system that has a geometric development vertical with respect to the sliding surface of the reactants in each micro cell, as shown in FIG. 2. This implementation has the anode A and the cathode C of each micro cell, realized by means of plates of a material that has been suitably treated on a surface and being treated mechanically for the realization of serpentines of outflow channels of the gaseous reactants.

These "stack" systems require the use of intermediate plates of the bipolar type, that simultaneously serve as anode A on one side and as cathode C on the other for two distinct consecutive micro cells of the stack, which allows separating the gaseous reactants. The plates at the ends of the "stack" system are instead of the monopolar type serving exclusively as anode A or as cathode C for the respective micro cell.

The known implementations of "stack" systems, although advantageous in several aspects and functional for the enhancement of the voltage, however, have some drawbacks. In fact, the gaseous reactants typically must be sent to a higher pressure than the atmospheric one for overcoming the fluid-dynamic resistances due to the channel serpentines realized in the bipolar plates. It is thus sometimes necessary to adopt suitable pump systems both for the hydrogen and for the oxygen. The pump systems may require energy for operating and a further control system to manage the amount of the reactants, and are also usually noisy. These "stack" systems are thus more complex from the constructive viewpoint, especially for the management of the oxygen.

Moreover, the vertical geometric development of the "stack" system may be unusable in some electronic applications and thus offer little versatility.

Moreover, the intermediate plates may require the use of a substrate with a high strength and with high thickness and weight to allow the mechanical treatment on the two faces; but this, however, may jeopardize the final performance of the system in terms of volumetric or gravitational power density. Alternatively, the use of a substrate with high mechanical resistance and with contained weight, such as for example graphite, has a high cost that may preclude the possibility of realizing "stack" systems being compact and low cost at the same time.

To solve these drawbacks, other solutions of systems for the generation of electric power with micro fuel cells employ plates or current collectors with compound material used for the realization of printed circuits PCB or Printed Circuit Boards. This may allow reducing the vertical dimensions in the case of the "stack" configuration and also may allow isolating each electrode in a coplanar configuration of the micro cells, allowing an easier parallel connection of the micro cells that may allow enhancing the current supplied to the load. An implementation is shown in FIGS. 3A and 3B.

The plates realized in PCB technology comprise one or more thin layers of non-conductive compound material, for example FR4 (Frame Retardant of the 4 type) and CEM1 (Composite Epoxy Material of the 1 type), covered by a layer of conductive material whereon it is possible to realize conductive tracks or passages for conveying the current generated. Thanks to the maturity of the PCB technology, it is also possible to integrate, through metallic tracks of copper, possible electronic circuits for the control and the conditioning of the electric power produced by the micro cells, thus realizing a compact and efficient system (System on a Package).

It is noted that the electric power supplied by the micro cells does not necessarily adapt itself to the electric power requested by a user/load and this implies the presence of conditioning circuits for adapting the electric power generated to the user's/load's requests. The ensemble constituted by the conditioning circuit of the electric power and by the final load, affect the connection mode in series and/or in parallel between the micro cells of the system.

The "stack" or planar system realized with PCB technology may have advantages and may allow realizing passive systems at the cathode, without the need of employing fans or compressors for the inflow of the oxygen from the air realizing planar "stack" systems of small power (1-5 W) that adapt themselves to the form factors of the portable electronic applications.

However, this type of system also has some drawbacks linked to the realization of systems with a request of an electric power to the load comprised between 5 and 10 W.

In fact, in a planar "stack" system of micro fuel cells in PCB technology, the implementation occupies a rather large surface area, and this may require a significant amount of material employed with a consequent problem of space for the integration in the portable electronic systems.

SUMMARY

An embodiment is a system for generating electric power with micro fuel cells, the system being cheap and versatile for realizing in a simple, quick, and low cost way connections in series and/or in parallel between the micro cells and having such structural and functional characteristics as to allow overcoming the limits still affecting the systems realized according to the prior art.

An embodiment includes simultaneously supplying the fuel to the micro cells composing the system.

An embodiment is a system for generating electric power with micro fuel cells comprising at least one first micro cell and at least one second micro cell, each micro cell having an anode and a cathode with a membrane (MEA) being sandwich-wise interposed; wherein the system comprises a spacer element having an annular element that surrounds a cavity, said annular element being associated with said anode of said first micro cell and with said anode of said second micro cell to realise a common diffusion chamber for the fuel of said first micro cell and of said second micro cell.

The cavity of the spacer element allows passing of fuel, said annular element being sandwich-wise interposed between said anode of said first micro cell and said anode of said second micro cell for an arrangement of the micro cells that may allow doubling the energy generated on an occupied surface of a given size.

Suitably, the cavity of the spacer element may be hidden, said spacer element comprising a plate with said annular element projecting from a same side of said plate to define said cavity, said annular element being associated with said anode of said first micro cell and with said anode of said second micro cell to realize a system having micro cells with improved efficiency being arranged side by side.

The spacer element may comprises an input hole and an output hole for said fuel, said input hole and said output hole being in fluid communication with said diffusion chamber.

Suitably, the system may comprise at least one connection pin interposed between said at least one first micro cell and said at least one second micro cell to realize an electric connection between each other of the series type and/or of the parallel type.

The system may be of the modular type and may comprise a total number of first micro cells and of second micro cells equal to a power of two.

The first micro cell of the system may be a first modular structure and the second micro cell may be a second modular structure, the first modular structure and the second modular structure comprising respectively a plurality of micro cells coupled with respective anodes and respective cathodes arranged side by side and on parallel planes.

Two or more systems, realized according to an embodiment, may be overlapped and suitably interspaced with respect to each other.

Another embodiment is a process for generating electric power with a system comprising at least one first micro cell and at least one second micro cell each being realized by sandwich-wise interposing of a membrane (MEA) between an anode and a cathode; wherein is also included a spacer element comprising an annular element and a cavity;

realising a common diffusion chamber facing said anode of said first micro cell and said anode of said second micro cell to said cavity;

simultaneously supplying said fuel to said first micro cell and to said second micro cell through said common diffusion chamber.

An embodiment of a process allows realizing said passing cavity in said spacer element and to sandwich-wise interpose said annular element between said anode of said first micro cell and said anode of said second micro cell.

An embodiment allows realizing said hidden cavity in said spacer element and associating said anode of said first micro cell and said anode of said second micro cell with said annular element.

BRIEF DESCRIPTION OF THE DRAWINGS

Characteristics and advantages of an embodiment will be apparent from the following description, which is given by way of indicative and non limiting example with reference to the annexed drawings.

FIG. 4 shows a section view of a system for the generation of electric power with micro fuel cells realized according to an embodiment.

FIGS. 5A-5F show perspective views of some components of the system of FIG. 4 according to an embodiment.

FIGS. 6A and 6B show a perspective view, respectively from above and from the bottom, of the system shown in FIG. 4 with a series connection between the micro cells of the system according to an embodiment.

FIG. 6C, shows a perspective view of the system shown in FIG. 4 with a parallel connection between the micro cells of the system according to an embodiment.

FIGS. 7 and 8 respectively show in a section view and in a perspective view, a system realised according to an embodiment.

FIGS. 9 and 10 show a perspective view of a system realized according to respective embodiments.

DETAILED DESCRIPTION

Figure 1A:
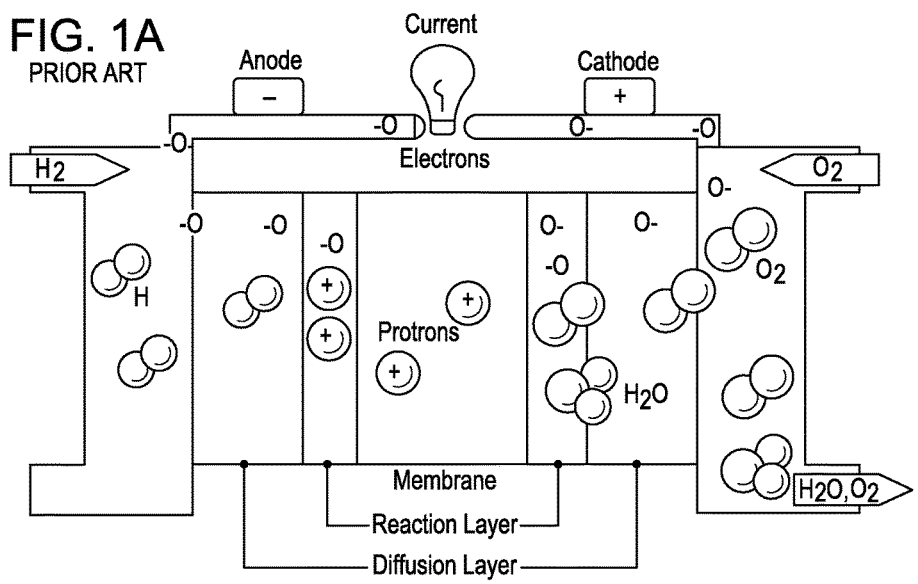
FIGS. 1A and 1B show a section of a micro fuel cell, realized according to the prior art.
Figure 1B:
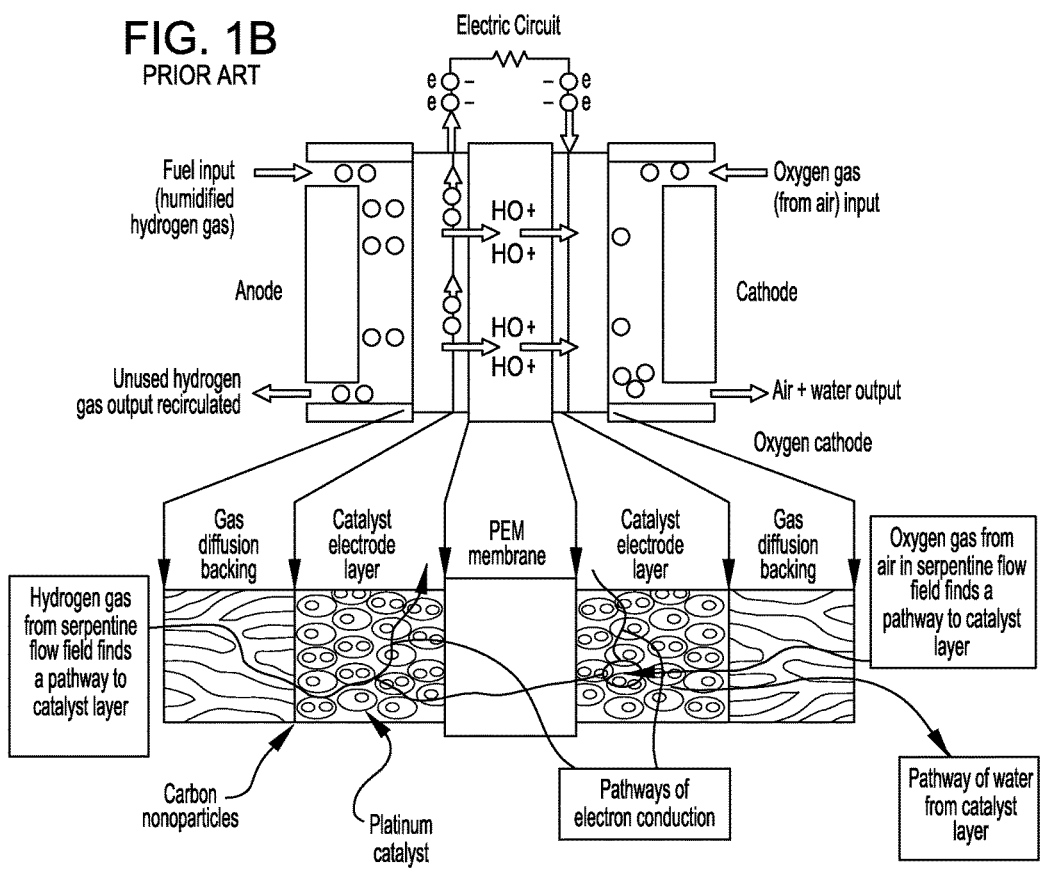
Figure 3A:
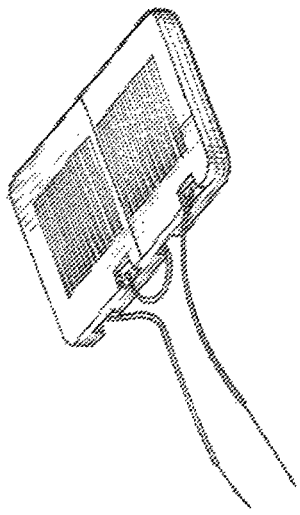
FIGS. 3A and 3B respectively show a perspective view and an exploded view of a planar system of two micro fuel cells realized in PCB technology, according to the prior art.
Figure 3B:
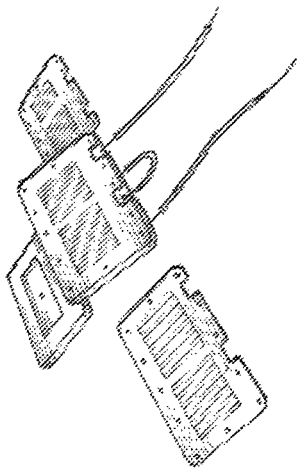
Figure 2:
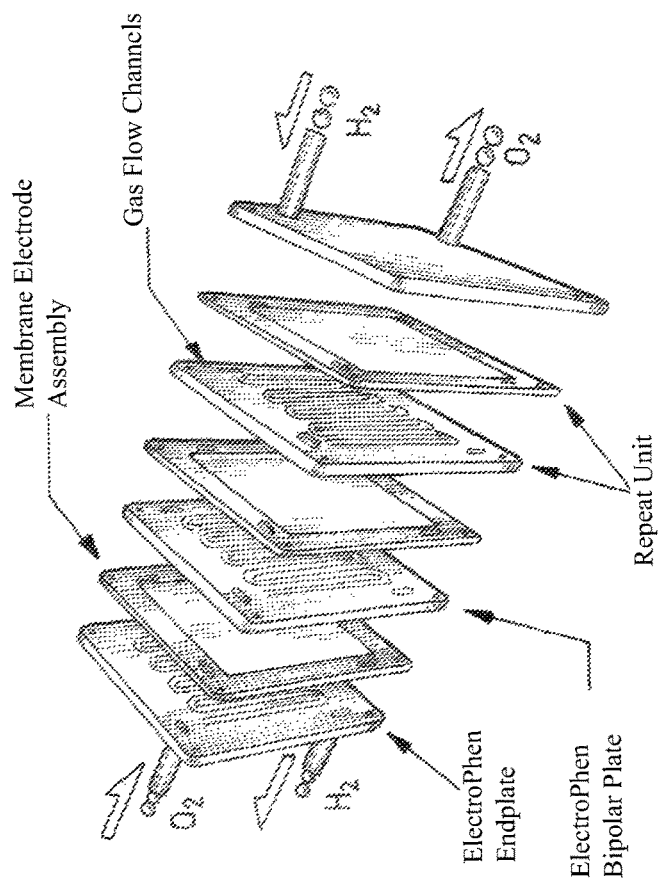
FIG. 2 shows a perspective view of a "stack" system of micro fuel cells realized according to the prior art.

With reference to these figures, 1 globally and schematically indicates an embodiment of a system for generating electric power of the modular type with two or more bi-planar micro fuel cells able to supply an electric power according to the request of a connected electronic application/load.

It is noted that the figures showing schematic views of portions of the micro cells may not be drawn to scale, but may instead be drawn so as to emphasize important characteristics of an embodiment.

Referring to FIG. 4, the system 1 comprises a first micro cell 2 and a second micro cell 3 supplied by fuel such as, for example, gaseous hydrogen $H_2$, and coupled to each other.

The first micro cell 2 and the second micro cell 3 may be identical with respect to each other and of the passive type and each substantially comprise:
- an anode, respectively 2A and 3A, defined by a first plate 4 realised in PCB technology, which is supplied, as a reactant, with gaseous hydrogen $H_2$;
- a cathode, respectively 2C and 3C, defined by a further plate 4' realised in PCB technology, which is supplied, as a reactant, with oxygen $O_2$ taken directly from the environment air surrounding the micro cell itself, to form a micro cell of the "air-breathing" type;
- a membrane MEA comprising a solid electrolyte realized by means of a polymeric membrane PEM being sandwich-wise interposed between two carbon layers.

The system 1 also comprises a spacer element 5 defined by an annular element 7 that surrounds a cavity 6a.

In particular, the spacer element 5 is associated with the anode A2 of the first micro cell 2 and with the anode A3 of the second micro cell 3 so that the cavity 6a realizes a common diffusion chamber 6 for simultaneously supplying the fuel to the first micro cell 2 and to the second micro cell 3.

According to an embodiment, shown in FIG. 4, the cavity 6a of the spacer element 5 is passing the fuel and the annular element 7 is interposed and peripherally surrounds the anode A2 of the first micro cell 2 and the anode A3 of the second micro cell 3. The anode A2 of the first micro cell 2 and the anode A3 of the second micro cell 3 thus face the cavity 6a and each other.

The plates 4 and 4', which define the anode A2, A3, and the cathode C2, C3 of each micro cell 2, 3 are substantially identical with respect to each other and, according to the PCB technology, they comprise one or more thin layers of non conductive compound material, for example FR4 (Frame Retardant of 4 type), covered by one or more layers of conductive material, for example gold (Au) and are suitably micro-treated. In particular, as shown respectively in FIGS. 5A and 5B, the plates 4 and 4' have on the surface a plurality of passing grooves 4a which are interspaced by suitable wings 4b. The grooves 4a allow the inflow of the reactants into the membrane MEA.

The grooves 4a of the plate 4 that defines the anode A2 and A3, and the grooves 4a of the plate 4' that defines the cathode C2 and C3 of each micro cell 2, 3 may be different from each other according to the stoichiometry of the reactions that occur respectively at the anode A and at the cathode C of the same micro cell.

Naturally, the plates 4 and 4' may comprise conductive metallic tracks, vias, or passages suitable for allowing the electric connection between the micro cells and with discrete electronic components suitable for the management and the control of the electric power generated by the system 1.

The membrane MEA, shown in FIG. 5C, is sandwich-wise interposed between the anode A2, A3 and the cathode C2, C3 of each micro cell 2, 3, and is assembled in a single step by means of the interposition of solid glue layers 11. The glue layers 11, shown in FIGS. 5E and 5F, are suitably shaped so as to maintain the grooves 4b free on the plates 4, 4'. The wings 4b on the plates 4, 4' allow sustaining the interposed membrane MEA.

Suitably, the cavity 6a of the spacer element 5, as shown in FIG. 5D, has such dimensions as to contain the grooves 4a when the annular element 7 is peripherally associated with the anode A2 of the first micro cell 2 and with the anode A3 of the second micro cell 3. In this way, the first micro cell 2 and the second micro cell 3 are "stack"-wise arranged in an arrangement defined as "bi-planar" with the diffusion chamber 6 interposed.

The electric connection between the first micro cell 2 and the second micro cell 3 is provided by the introduction of connection pins 15, realised with small shafts of conductive material, that passes across the system 1 and are inserted and fixed in correspondence with prearranged holes 4c realized in correspondence with the peripheral edge of the plates 4 and 4'. As shown in FIGS. 6A and 6B, the series electrical coupling between the first micro cell 2 and the second micro cell 3 is obtained with a connection pin 15 that couples the cathode C2 of the first micro cell 2 to the anode A3 of the second micro cell 3.

The conductive coating material of the plates 4, 4' allows realizing a conveyor of electrons that are made to flow, always through further connection pins 15, to the management and control circuitry of the electric power generated.

In a similar way, with a different arrangement of the connection pins 15 it may be possible to realize a bi-planar "stack" system 1 with the first micro cell 2 associated in electrical parallel with the second micro cell 3, as shown in FIG. 6C. This parallel coupling is obtained with a connection pin 15 that couples to each other the anode A2 of the first micro cell 2 and the anode A3 of the second micro cell 2 and a second connection pin 15 that couples to each other the cathode C2 of the first micro cell 2 to the cathode C3 of the second micro cell 3.

The spacer element 5 comprises an input hole or inlet 8, realized in correspondence with the annular element 7 in flow communication with the cavity 6a for the coupling to a stocking tank of the gaseous hydrogen $H_2$ by means of the interposition of a connector 10.

Moreover, the spacer element 5 comprises an output hole or outlet 9 realized in correspondence with the annular element 7, on the opposite part with respect to the input hole 8, in flow communication with the cavity 6a to allow the coupling to a stocking tank of the reaction by-products, by means of the interposition of a further connector 10.

Suitably, the connectors 10 may be of the pneumatic type or of other type while the stocking tank of the gaseous hydrogen $H_2$ may be alternatively a high pressure cylinder or a cryogenic container.

Moreover, the spacer element 5 is realized with any material compatible with the process of hot gluing of the FR4 of the plates 4 and 4'.

As regards the operation of the system 1, according to an embodiment, after having assembled the first micro cell 2 and the second micro cell 3, the spacer element 5 is sandwich-wise interposed. The cavity 6a interposed between the anode A2 of the first micro cell 2 with the anode A3 of the second micro cell 3 realizes the common diffusion chamber 6 for the first micro cell 2 and the second micro cell 3. In this way, the first micro cell 2 and the second micro cell 3 have the respective cathodes C2 and C3 arranged on the external surfaces of the system 1 which take oxygen $O_2$ from the environment surrounding the system 1 itself through the grooves 4a.

As shown in FIGS. 6A, 6B and 6C, the electric coupling is realized, and may be of the series or parallel type, between the first micro cell 2 and the second micro cell 3 with the external circuitry through respective connection pins 15. Also the fluhydric coupling is realized, through the interposition of connectors 10, with the stocking tank of the gaseous hydrogen H2 and with the collecting tank of the reaction by-products.

At the activation of the system 1, the gaseous hydrogen H2 is introduced into the cavity 6a through the connector 10 associated with the input hole 8 and the diffusion chamber 6, according to an embodiment, simultaneously supplies the anode A2 of the first micro cell 2 and the anode A3 of the second micro cells 3 facing each other.

The diffusion chamber 6, single for the system 1, may allow considerably improving the distribution of the gaseous hydrogen $H_2$ in the whole cavity 6, thus improving the performances of the system 1.

Thanks to the presence of the catalyst, finely dispersed in the membrane MEA, in the respective anodes A2 and A3 of the micro cells, the reactions of oxide-reduction are activated. While the gaseous hydrogen H2 is resolved into protons of hydrogen and electrons, the protons of hydrogen pass through the membrane MEA of each micro cell and are combined with the oxygen $O_2$ in the cathode C2 of the first micro cell 2 and of the cathode C3 of the second micro cell 3, to form water and heat.

The electrons freed are conveyed through the connection pins 15 to the conditioning and control circuitry of the electric power generated by the system 1 and thus to the load.

According to an embodiment, the anode A2 of the first micro cell 2 and the anode A3 of the second micro cell 3 thus have a double function:
 they allow collecting the free electrons for generating electric power, the plates 4, 4' being coated with a conductive layer;
 they allow diffusing the gaseous hydrogen $H_2$, i.e. the reactant, making it reach the membrane MEA through the grooves 4a.

Figure 13:
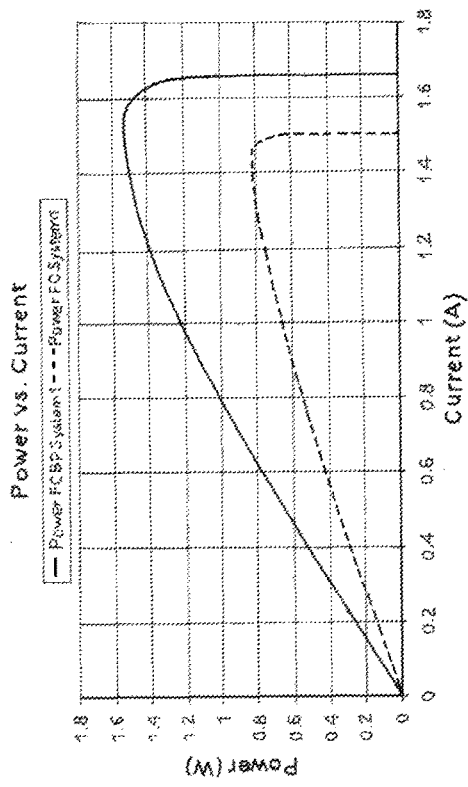
FIG. 13 shows a diagram that compares the electric power curves of a system according to an embodiment shown in FIG. 4 and of a system with a single micro cell realized according to the prior art.

As it may be understood from the curves reported in the diagram shown in FIG. 13, by comparing the bi-planar "stack" system 1 with two micro cells couple in series, according to an embodiment, with a system comprising a micro fuel cell in PCB technology realized according to the prior art, the space surface occupied being identical and having a limited increase in thickness, due to the presence of the spacer element 5, a gain factor 2:1 is obtained, i.e. there is the possibility to generate a double electric power having an identical occupied surface.

A second embodiment of a system 1 for the generation of electric power is shown in FIG. 7 and comprises a first micro cell 2 and a second micro fuel cell 3 that are arranged side by side and coupled in a contiguous way, supplied with gaseous hydrogen $H_2$.

As regards details and cooperating parts having the same structure and function as previously described, they will be indicated with the same reference numbers and acronyms.

According to an embodiment, the anode A2 of the first micro cell 2 and the anode A3 of the second micro cell 3 as well as the respective cathodes, C2 and C3 are arranged side by side on parallel planes. The plates 4 and 4' that define the anodes A2 and A3 and the cathodes C2 and C3 are substantially equal to each other and comprise a central portion provided with a plurality of grooves 4a alternated with a plurality of wings 4b, according to what has been previously described.

The system 1 comprises a spacer element 5, which is provided with a plate 16 substantially "U"-like shaped with an annular element 17 projecting from a same side with respect to said plate 16 to define a cavity 16a. The annular element 17 is peripherally associated with the respective anode A2 of the first micro cell 2 and with the anode A3 of the second micro cell 3 and connected in a per se known way through one or more layers of glue 11 or other technique. The cavity 16a of the spacer element 5 defines with the first micro cell 2 and the second micro cell 3 a common diffusion chamber 6 of the system 1 for supplying simultaneously with gaseous hydrogen $H_2$ the first micro cell 2 and the second micro cell 3.

The plate 16 comprises an input hole or inlet 8 and an output hole or outlet 9 both in flow communication with the cavity 16a and suitable for allowing respectively the coupling to a stocking tank of the gaseous hydrogen $H_2$ and to a collection tank of the reaction by-products, possibly through the interposition of corresponding connectors 10.

The diffusion chamber 6 allows, in particular, to make uniform the distribution of the gaseous hydrogen $H_2$ in the cavity 16a supplying simultaneously the anode A2 of the first micro cell 2 and the anode A3 of the second micro cell 3, improving in a considerable way the performances of the system 1. This arrangement is indicated as a planar system of the "bi-planar" type.

Naturally, further realization layouts may be obtained by suitably combining the implementations indicated in two or more of the above-described embodiments.

For example, a third embodiment is shown in FIG. 9. The implementation provides a bi-planar "stack" system 1 comprising a spacer element 5 being sandwich-wise interposed between an anode of a first modular structure 22 and an anode of a second modular structure 23.

The first modular structure 22 and the second modular structure 23 comprise an equal number of micro cells which have the respective anodes A and the respective cathodes C arranged side by side and on parallel planes.

The spacer element 5 thus has an annular element 7 that surrounds a cavity 6a which defines with the anode A22 of the first modular structure 22 and the anode A23 of the second modular structure 23 a common diffusion chamber 6 for supplying the gaseous hydrogen $H_2$ simultaneously to the whole system 1.

This implementation, that constitutes an integration of embodiments previously described, allows further increasing the electric power and thus the electric power generated by the system 1.

Figure 10:
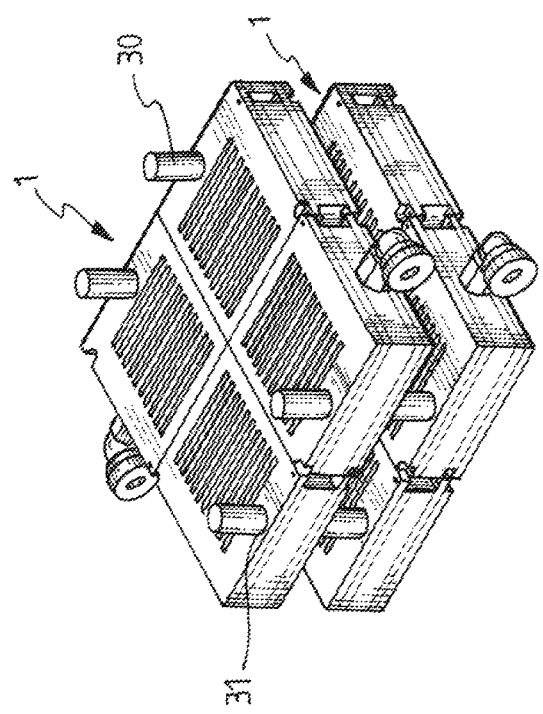
Figure 11:
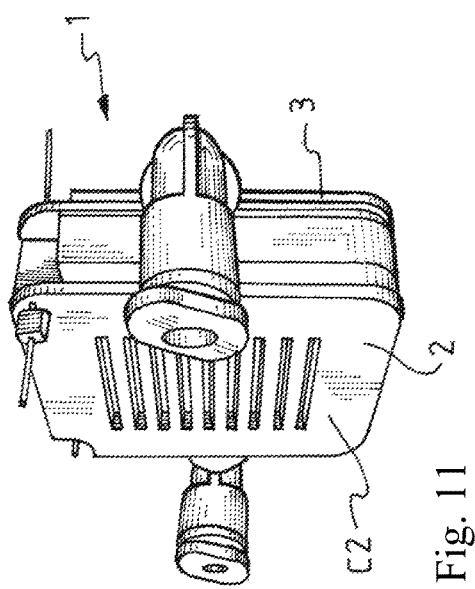
FIGS. 11 and 12 show two perspective views of a prototype realized according to an embodiment of FIG. 4.
Figure 12:
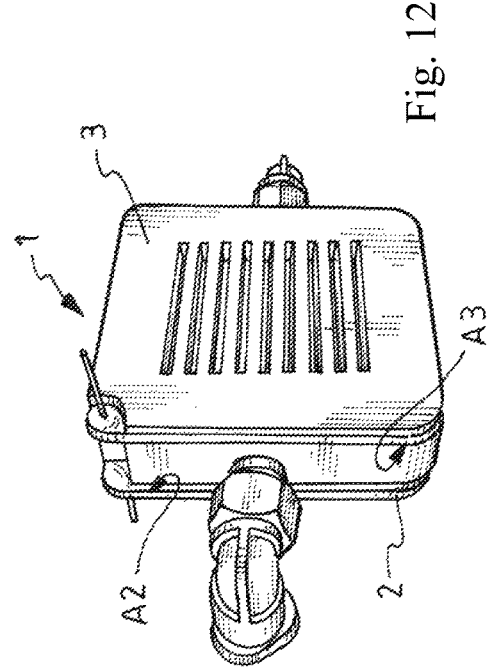

An embodiment is shown in FIG. 10. The embodiment provides the overlapping of two systems 1 independent from each other, that as shown, in an indicative and non-limiting manner, are realized according to the embodiment of FIG. 9. These systems 1 are suitably spaced by spacer elements 30 that define a gap for allowing the respective cathodes C, facing each other, to take oxygen in a passive way from the surrounding environment air. The separating elements 30 are small cylinders arranged in correspondence of the faced edges of each system 1 inserted in counter-shaped seats 31. FIGS. 11 and 12 show a prototype realized of an embodiment of a system of micro fuel cells according to an embodiment shown and described above with reference to FIG. 4.

The prototype system 1 comprises a first micro cell 2 and a second micro cell 3 realized in PCB technology of active area equal to approximately 3.6 cm². The prototype system 1 may be electrically characterized by means of a FCTS (Fuel Cell Test Station), by sending hydrogen to the anode A2 of the first micro cell 2 and to the anode A3 of the second micro cell 3 and making the oxygen being taken in a passive way from the environment air surrounding the respective cathodes C2 and C3.

Figure 14:
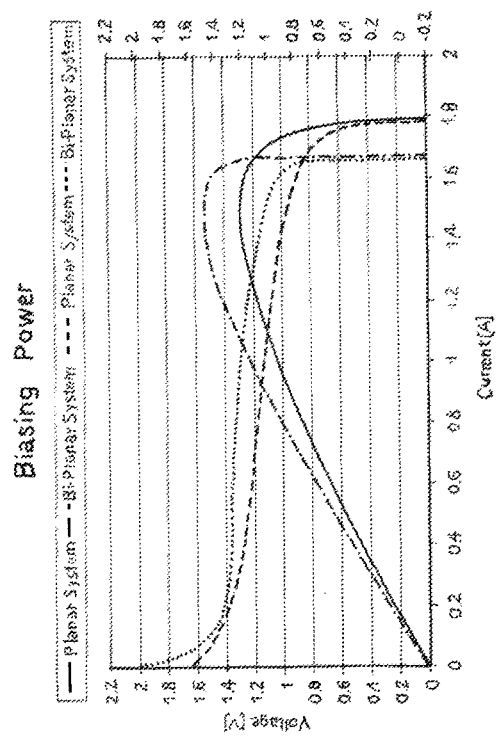
FIG. 14 shows a diagram that reports the biasing and electric power curves of a system realized according to an embodiment with two micro fuel cells in comparison with a similar system realized according to the prior art shown in FIG. 3A.

In the diagram shown in FIG. 14, with the light color a biasing curve of the prototype system 1 is reported when the load applied in a decreasing way varies from the starting conditions of open circuit. In particular, the diagram of FIG. 14 compares the voltage and electric power curves between the prototype system 1 and a similar system, also realized in PCB technology, but realized according to the prior art. Even more in particular, an improvement may be observed of the performances of the system 1 according to an embodiment with respect to the prior art system in terms of maximum power reached, approximately 1.54 W compared to 1.29 W. This is mainly due to the better distribution of the gaseous hydrogen $H_2$ that, in the case of the system according to an embodiment, is introduced in the common diffusion chamber 6 for all the micro cells of the whole system 1 before reaching the respective membranes MEA.

Moreover, considering a surface occupied by the system of approximately 3.6 cm² the power density of the system, realized according to an embodiment, takes a value of approximately 213 mW/cm² while for a system according to the prior art it is of approximately 178 mW/cm².

The system, according to an embodiment, does not preclude in any way the possibility to use other types of fuel such as for example methanol ($CH_3OH$) instead of gaseous hydrogen $H_2$.

An embodiment also relates to a process for generating electric power by means of a system with micro fuel cells as previously described for which details and cooperating parts having the same structure and function will be indicated with the same reference numbers and acronyms.

The system 1 comprising at least one first micro cell 2 and at least one second micro cell 3 that may be associated with each other. The first micro cell 2 and the second micro cell 3 are realized by sandwich-wise interposing a polymeric membrane MEA between an anode A2, A3 and a cathode C2, C3 of the respective micro cell.

The process provides prearranging a spacer element 5 comprising an annular element 7 that surrounds a cavity 6a.

The process thus provides a common diffusion chamber 6 by facing the anode A2 of the first micro cell 2 and the anode A3 of the second micro cell 3 with the cavity 6a. This common diffusion chamber 6 being suitable for simultaneously supplying the fuel, i.e. the gaseous hydrogen $H_2$, to the first micro cell 2 and to the second micro cell 3.

The process also provides an input hole 8 and an output hole 9 in said spacer element 5 for the coupling respectively to a stocking tank of the gaseous hydrogen $H_2$ and to a collecting tank of the reaction by-products.

Moreover, the process provides electrically coupling the first micro cell 2 and the second micro cell 3, according to a series or parallel arrangement, by associating and fixing to the respective prearranged anodes and/or cathodes connection pins 15.

In an embodiment shown in FIG. 4, the cavity 6a of the passing type is realized and the process provides to sandwich-wise interpose the annular element 7 between the anode A2 of the first micro cell 2 and the anode A3 of the second micro cell 3 to define said common diffusion chamber 6 for the whole system 1.

In an embodiment shown in FIG. 7, the process provides to realize the hidden cavity 16a in said spacer element 5. In particular, the process provides to realise the spacer element 5 by prearranging a plate 16 substantially "U"-like shaped with an annular element 17 projecting from a same side with respect to said plate 16 so as to define inside said cavity 16a.

The process also provides to prearrange, side by side, the first micro cell 2 and the second micro cell 3 by associating the anode A2 of the first micro cell 2 and the anode A3 of the second micro cell 9 with the annular element 7 so as to define with the cavity 16a the single diffusion chamber 6 for the whole system 1.

An advantage of a system according to an embodiment lies in its remarkable compactness and in its assembling simplicity. In fact, the common and single diffusion chamber for the whole system allows simultaneously supplying the gaseous hydrogen $H_2$ to the anodes of the micro cells substantially reducing by almost a half the space surface of systems that generate similar electric power but are realized by means of the prior art.

A further advantage of a system according to an embodiment is the versatility of the same that allows implementing solutions that have, the electric power produced being identical, a layout and thus space dimensions that may be defined according to the needs of the load: physical dimensions and requested electric power.

An advantage of a process according to an embodiment is the significant simplification of the assembling operations that allow realizing systems with compact architectures, with good mechanical resistance, and contained weight.

Another advantage of a system and of a process according to an embodiment is the reduction in the overall realization costs. The system in fact does not require the use of special packages for the containment of the electrodes, it has a direct interfacing of the micro cells with the external environment and for the introduction of the reactants and also for the coupling to the management and control circuitry of the electric power generated.

From the foregoing it will be appreciated that, although one or more specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A system comprising:
    a first hydrogen fuel cell comprising an anode, a cathode, and a membrane between the anode and the cathode;
    a second hydrogen fuel cell comprising an anode, a cathode, and a membrane between the anode and the cathode;
    a spacer element comprising an annular element surrounding a cavity between the first hydrogen fuel cell and the second hydrogen fuel cell, the annular element having a single inlet port and a single outlet port in an opposite side of the single inlet port; and
    a common output connector coupled between the single outlet port and a collecting tank, wherein the anode of the first hydrogen fuel cell and the anode of the second hydrogen fuel cell are exposed to the cavity.

2. The system of claim 1, wherein:
    the anode of the first hydrogen fuel cell and the anode of the second hydrogen fuel cell comprise a first plate; and
    the cathode of the first hydrogen fuel cell and the cathode of the second hydrogen fuel cell comprise a second plate.

3. The system of claim 2, wherein the first plate and the second plate each comprise a layer of frame retardant of the 4 type (FR4) material.

4. The system of claim 2, wherein the first plate and the second plate each comprise a plurality of passing grooves interspaces by wings.

5. The system of claim 2, wherein the first plate and the second plate each have a hole in a peripheral edge of the respective plate.

6. The system of claim 5, further comprising a connection pin coupled to the peripheral edge of the first plate.

7. The system of claim 1, wherein the membrane of the first hydrogen fuel cell and the membrane of the second hydrogen fuel cell each comprises solid electrolyte sandwich-wise interposed between two carbon layers.

8. A system comprising:
    a first fuel cell comprising an anode, a cathode, and a membrane between the anode and the cathode;
    a second fuel cell comprising an anode, a cathode, and a membrane between the anode and the cathode;
    a spacer element comprising an annular element surrounding a cavity between the first fuel cell and the second fuel cell, the annular element having a single inlet port and a single outlet port in an opposite side of the single inlet port; and
    a common output connector coupled to the single outlet port, wherein the anode of the first fuel cell and the anode of the second fuel cell are exposed to the cavity.

9. The system of claim 8, wherein the cavity comprises methanol ($CH_3OH$).

10. A system comprising:
    a first fuel cell comprising an anode, a cathode, and a membrane between the anode and the cathode;
    a second fuel cell comprising an anode, a cathode, and a membrane between the anode and the cathode;
    a spacer element comprising an annular element surrounding a cavity between the first fuel cell and the second fuel cell, the annular element having a single inlet port and a single outlet port in an opposite side of the single inlet port; and
    a common output connector coupled to the single outlet port, wherein the anode of the first fuel cell and the anode of the second fuel cell are exposed to the cavity, the first fuel cell and the second fuel cell being configured to receive a first reactant in a gaseous state into the cavity, and a second reactant in a gaseous state, and generate a product in a liquid state.

11. A system comprising:
    a plurality of modular fuel cell structures coupled to one another and each comprising
        a first micro fuel cell comprising a first plurality of electrodes,
        a second micro fuel cell spaced apart from the first micro fuel cell and comprising a second plurality of electrodes, and
        an annular spacer defining a cavity between the first micro fuel cell and the second micro fuel cell and an inlet and an outlet to the cavity, the inlets and outlets of the plurality of modular fuel cells being interconnected so that the cavities define a common diffusion chamber for supplying fuel to all of the modular fuel cell structures simultaneously;
    a common input connector coupling an input of the plurality of modular fuel cell structures to a fuel stocking tank; and
    a common output connector coupled between a single common output of the plurality of modular fuel cell structures and a collecting tank.

12. The system of claim 11 further comprising a plurality of conductive pins electrically connecting each first micro fuel cell in series with the corresponding second micro fuel cell.

13. The system of claim 11 further comprising a plurality of conductive pins electrically connecting each first micro fuel cell in parallel with the corresponding second micro fuel cell.

14. The system of claim 11 wherein each first micro fuel cell further comprises a first spacer layer, and wherein the first electrodes of each first micro fuel cell are arranged on opposing sides of the first spacer layer; and wherein each second micro fuel cell further comprises a second spacer layer, and wherein the second electrodes of each second micro fuel cell are arranged on opposing sides of the second spacer layer.

15. The system of claim 11 wherein the plurality of first electrodes and the plurality of second electrodes have grooves therebetween to permit the inflow of oxygen to the common diffusion chamber.

16. The system of claim 11, wherein:
    the plurality of modular fuel cell structures comprises a single common input; and
    the common input connector is coupled between the single common input of the plurality of modular fuel cell structures and the fuel stocking tank.

17. The system of claim 11, wherein the common diffusion chamber comprises hydrogen ($H_2$).

18. The system of claim 11, wherein anodes of the plurality of modular fuel cell structures comprise a first plate.

19. The system of claim 18, wherein the first plate comprises a first layer of non conductive compound material covered by a second layer of conductive material.

20. The system of claim 19, wherein the first layer comprises frame retardant of the 4 type (FR4) material.

21. The system of claim 19, wherein the second layer comprises gold (Au).

22. The system of claim 19, wherein the first plate comprises conductive tracks.

\* \* \* \* \*